(12) United States Patent
Ofer

(10) Patent No.: US 7,472,223 B1
(45) Date of Patent: Dec. 30, 2008

(54) SURFACE LEVEL SPARING IN DISK DRIVES

(75) Inventor: Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 253 days.

(21) Appl. No.: 11/529,143

(22) Filed: Sep. 28, 2006

(51) Int. Cl.
*G06F 13/00* (2006.01)
*G06F 11/16* (2006.01)

(52) U.S. Cl. ............................ 711/112; 711/4; 714/7; 714/8

(58) Field of Classification Search ................ None
See application file for complete search history.

(56) References Cited

U.S. PATENT DOCUMENTS

| | | | |
|---|---|---|---|
| 5,216,655 A | 6/1993 | Hern et al. | |
| 6,526,476 B2 | 2/2003 | Wilson et al. | |
| 6,697,958 B1 * | 2/2004 | Yada et al. | 714/6 |
| 6,839,802 B2 * | 1/2005 | Dimitri et al. | 711/112 |
| 6,925,580 B2 * | 8/2005 | Hoskins | 714/8 |
| 6,947,234 B2 | 9/2005 | Lamberts et al. | |
| 6,978,345 B2 | 12/2005 | Tomaszewski et al. | |
| 7,245,445 B2 | 7/2007 | Lee | |
| 2005/0114350 A1 | 5/2005 | Rose et al. | 707/10 |
| 2005/0144517 A1 * | 6/2005 | Zayas | 714/8 |
| 2006/0107131 A1 | 5/2006 | Mills et al. | 714/710 |

* cited by examiner

*Primary Examiner*—Than Nguyen
(74) *Attorney, Agent, or Firm*—BainwoodHuang

(57) ABSTRACT

A technique involves accessing a hard disk platter surface using surface virtualization. The technique includes receiving a command to access a hard disk platter surface. The command specifies an address. The technique further includes providing a virtual surface identifier based on the address specified by the command, and generating a particular real surface identifier based on the virtual surface identifier. The particular real surface identifier corresponds to a particular hard disk platter surface among multiple hard disk platter surfaces of a set of disk drives. The technique further includes accessing the particular hard disk platter surface among the multiple hard disk platter surfaces of the set of disk drives based on the particular real surface identifier. Such operation is capable of being carried out within a disk drive controller in a manner that is transparent to a host, or alternatively by the host.

20 Claims, 8 Drawing Sheets

| ENTRY NUMBER | VIRTUAL SURFACE IDENTIFIER | REAL SURFACE IDENTIFIER |
|---|---|---|
| 1 | VS1 | RS1 |
| 2 | VS2 | RS2 |
| 3 | VS3 | RS3 |
| 4 | VS4 | RS4 |
| 5 | VS5 | RS5 |

FIG. 2

| ENTRY NUMBER | VIRTUAL SURFACE IDENTIFIER | REAL SURFACE IDENTIFIER |
|---|---|---|
| 1 | VS1 | RS6 |
| 2 | VS2 | RS2 |
| 3 | VS3 | RS3 |
| 4 | VS4 | RS4 |
| 5 | VS5 | RS5 |

FIG. 7

| ENTRY NUMBER | VIRTUAL SURFACE IDENTIFIER | REAL SURFACE IDENTIFIER |
|---|---|---|
| 1 | VS1_1 | RS1_1 |
| 2 | VS1_2 | RS1_2 |
| 3 | VS1_3 | RS1_3 |
| 4 | VS1_4 | RS1_4 |
| 5 | VS1_5 | RS1_5 |
| 6 | VS2_1 | ~~RS2_1~~ R1_6 |
| 7 | VS2_2 | RS2_2 |
| 8 | VS2_3 | RS2_3 |
| 9 | VS2_4 | RS2_4 |
| 10 | VS2_5 | RS2_5 |
| 11 | VS2_6 | RS2_6 |
| ⋮ | ⋮ | ⋮ |

FIG. 8

SURFACE LEVEL SPARING IN DISK DRIVES

BACKGROUND

A typical data storage system includes storage control circuitry (e.g., a front-end server, a storage processor, a set of directors, etc.) and hard disk drives. The storage control circuitry performs a variety of data storage operations (e.g., load and store operations) on behalf of one or more external clients by sending hard drive commands to the hard disk drives. A typical command uses an LBA (Logical Block Address) addressing mode in which the command specifies a starting LBA and a count.

A typical hard disk drive includes multiple hard disk platters mounted to a common spindle. Each hard disk platter defines a top surface and a bottom surface for storing data in a non-volatile manner. The hard disk drive further includes a disk drive controller and, for each platter surface, a read head and a write head which are controlled by the disk drive controller to respectively read data from and write data to that platter surface.

In addition to the disk drives that regularly maintain data, it is common practice for a data storage system to include a hot spare disk drive. When a regular disk drive fails, the hot spare disk drive kicks in by taking over the role of the failing disk drive. That is, the storage control circuitry stores a copy of the data that currently exists on the failing disk drive onto the hot spare disk drive. The storage control circuitry then operates the hot spare disk drive in place of the failing disk drive. Typically, the failing disk drive is then removed from the data storage system and discarded by a technician.

SUMMARY

Unfortunately, there are deficiencies to the above-described approach to handling a disk drive failure. For example, in some cases only one head (i.e., a read head or a write head) for one platter surface fails within a disk drive. In response to such a failure, the storage control circuitry deems the entire disk drive to have failed and replaces the entire disk drive with a hot spare disk drive. Such operation of the storage control circuitry is wasteful since the remaining platter surfaces of the failed disk drive may still be usable. Moreover, when the storage control circuitry stores a copy of the entire failed disk drive onto the hot spare disk drive, the storage control circuitry consumes a significant amount of data storage system resources.

In contrast to the above-described conventional approach to handling a single platter surface failure of a disk drive by placing a copy of all of the data on that failing disk drive onto a hot spare disk drive, an improved technique involves providing access to platter surfaces using surface virtualization. Here, a mapping function is capable of mapping virtual platter surfaces to real platter surfaces (or alternatively virtual disk drive heads to real disk drive heads). Accordingly, from the perspective of a host, disk accesses can be carried out by addressing LBAs which translate to virtual platter surfaces. If there is a failure of a particular real platter surface, the mapping function can simply re-map the virtual platter surface to a new real platter surface without changing any addressing at the host (i.e., mapping of LBAs to virtual platter surfaces by the host can remain intact). Such a technique enables efficient surface-level sparing inside a disk drive.

One embodiment is directed to a method of accessing a hard disk platter surface using surface virtualization. The method includes receiving a command to access a hard disk platter surface. The command specifies an address (e.g., a Logical Block Address). The method further includes providing a virtual surface identifier based on the address specified by the command, and generating a particular real surface identifier based on the virtual surface identifier. The particular real surface identifier corresponds to a particular hard disk platter surface among multiple hard disk platter surfaces of a set of disk drives. The method further includes accessing the particular hard disk platter surface among the multiple hard disk platter surfaces of the set of disk drives based on the particular real surface identifier. Such operation is capable of being carried out within a disk drive controller in a manner that is transparent to a host, or alternatively by the host.

BRIEF DESCRIPTION OF THE DRAWINGS

The foregoing and other objects, features and advantages of various embodiments will be apparent from the following description and illustrations in the accompanying drawings in which like reference characters refer to the same parts throughout the different views. The drawings are not necessarily to scale, emphasis instead being placed upon illustrating certain principles of the various embodiments.

FIG. 2 is a block diagram of a mapping table which illustrates a mapping function performed by the data storage system of FIG. 1 for surface virtualization.

FIG. 7 is a block diagram of the mapping table when updated by the fault handling procedure of FIG. 5.

FIG. 8 is a block diagram of the mapping table illustrating operation of the fault handling procedure when the fault handling procedure is carried out by a host of the data storage system to enable utilization of a hot spare hard disk platter by multiple disk drives.

DETAILED DESCRIPTION

An improved technique involves providing access to hard disk platter surfaces using surface virtualization. Here, a mapping function is capable of mapping virtual platter surfaces to real platter surfaces (or alternatively virtual disk drive heads to real disk drive heads). Accordingly, from the perspective of a host, disk accesses can be carried out by addressing LBAs which translate to virtual platter surfaces. If there is a failure of a particular real platter surface, the mapping function can simply re-map the virtual platter surface to a new real platter surface without changing any addressing at the host (i.e., mapping of LBAs to virtual platter surfaces by the host can remain intact). Such a technique enables efficient surface-level sparing inside a disk drive.

Figure 1:
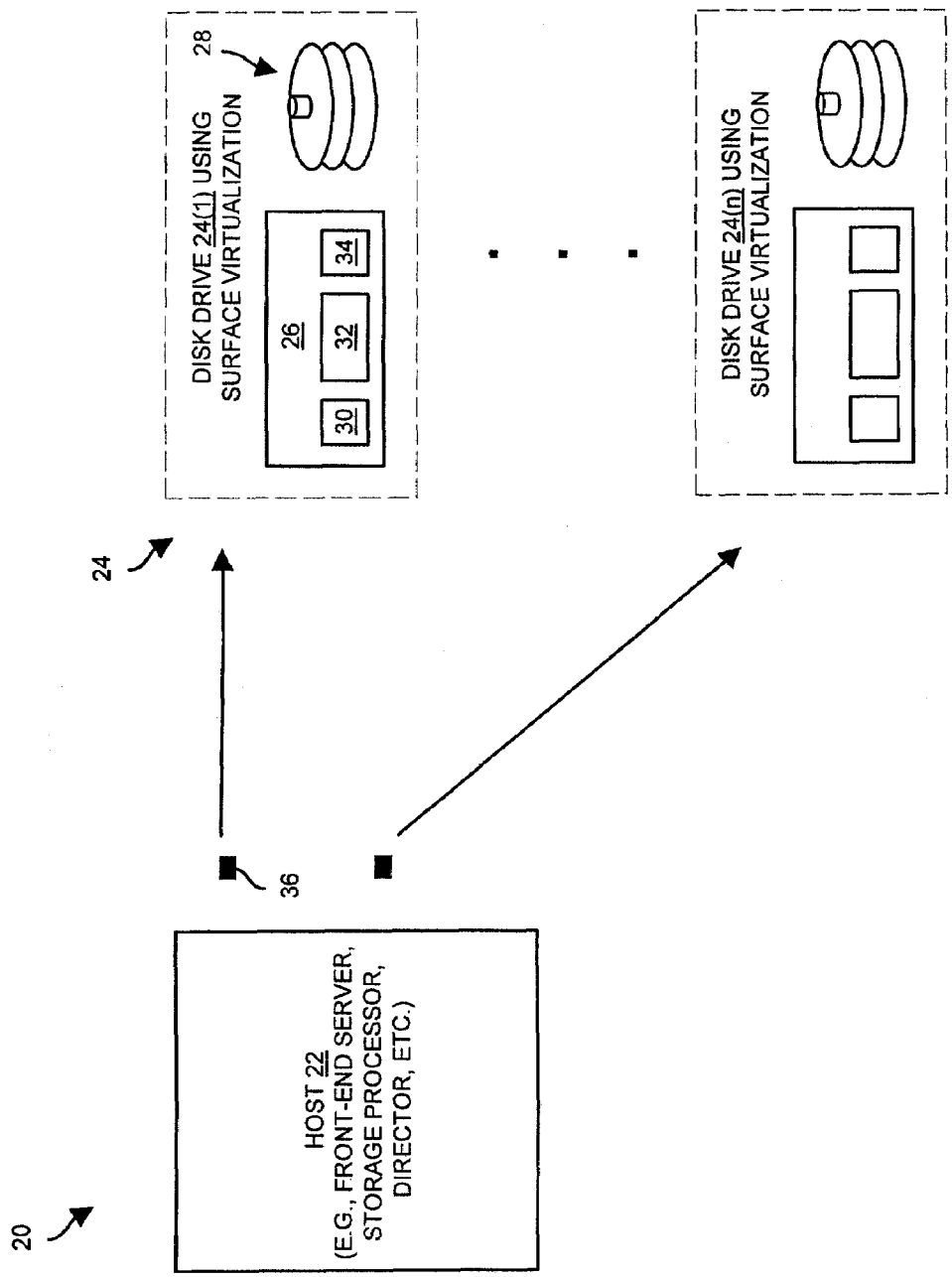
FIG. 1 is a block diagram of a data storage system which performs data storage operations using hard disk platter surface virtualization.

FIG. 1 is a block diagram of a data storage system 20 which performs data storage operations using hard disk platter surface virtualization. The data storage system 20 includes a host 22 and a set of disk drives 24(1), ..., 24(n) (i.e., one or more disk drives 24) coupled to the host 22. Each disk drive 24 includes electronic circuitry 26 and multiple hard disk platters 28 (or disks) which rotate on a common spindle. The electronic circuitry 26 of each disk drive 24 includes a host interface 30, a disk drive controller 32 and a platter interface 34 (see the disk drive 24(1) in FIG. 1).

During operation, the host 22 sends commands 36 to the disk drives 24 to perform a variety of data storage operations on behalf of one or more client devices. The disk drive controllers 32 receive the commands 36 through the host interfaces 30 and effectuate loading of data from and storing of data to the platters 28 through the platter interfaces 34 (i.e., read and write heads).

Such operation is carried out using virtualization of the platter surfaces. That is, the commands 36 address blocks of data using LBAs (Logical Block Addresses) which translate into virtual platter surfaces rather than real platter surfaces. The disk drive controllers 32 then perform mapping functions to translate the virtual platter surfaces into real platter surfaces. Accordingly, if there is a failure of a real platter surface (e.g., a failure of a read head or a write head to that platter surface) within a disk drive 24, the disk drive 24 can simply replace the failing platter surface with a spare platter surface and update the mapping so that the virtual platter surface now maps to the spare platter surface. As a result, there is no need to change the LBAs used by the host 22. Furthermore, there is no need to discard the disk drive having the failed platter surface. Rather, the remaining real platter surfaces of that disk drive are still available for use. As such, the disk drive 24 can continue to operate with simple re-mapping and discontinued use of the failed platter surface. Further details will now be provided with reference to FIGS. 2 and 3.

Figure 3:
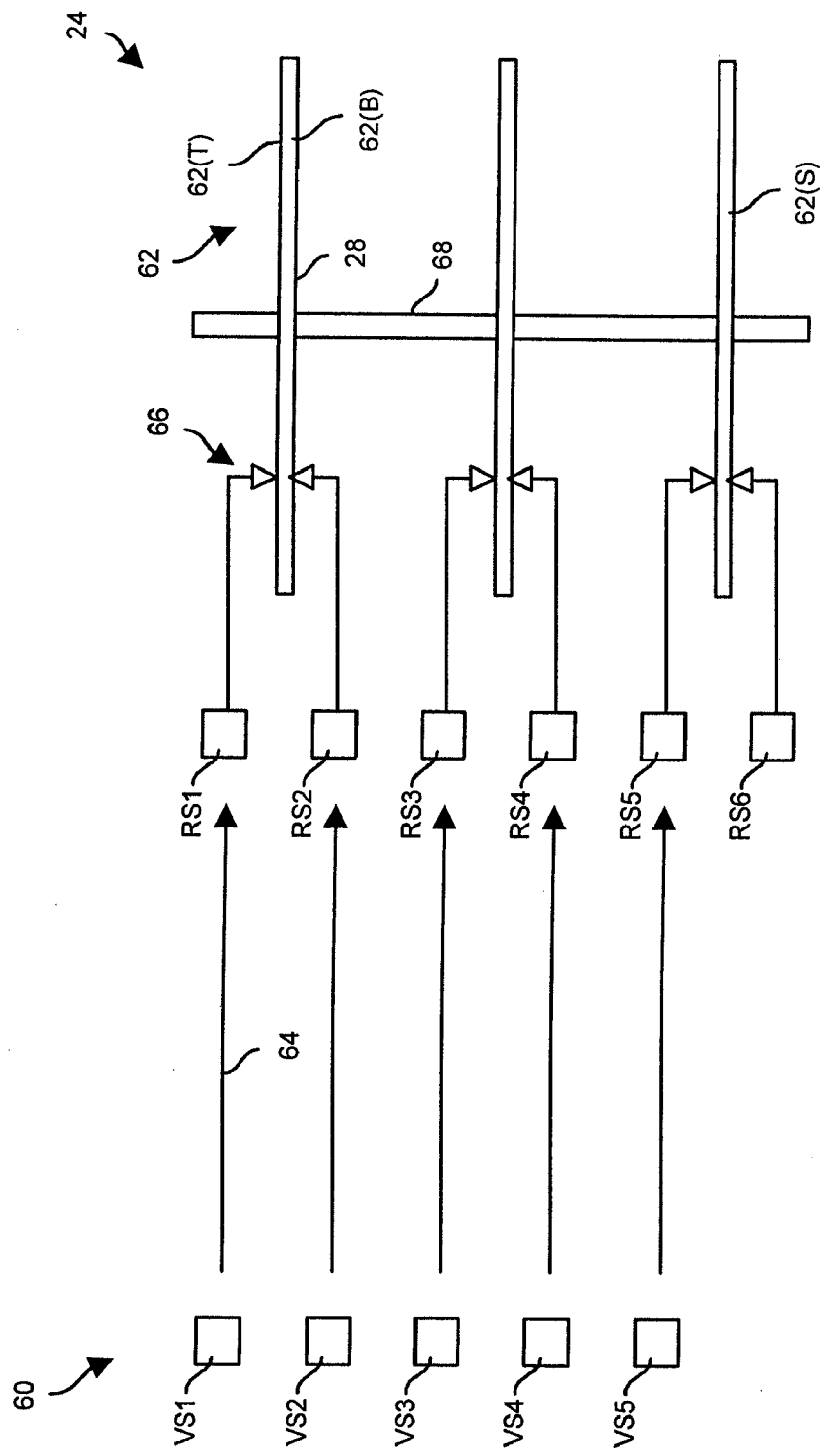
FIG. 3 is a block diagram of a set of hard disk platters and a current mapping state of platter surfaces in accordance with the mapping table of FIG. 2.

FIGS. 2 and 3 illustrate how surface virtualization is carried out by a disk drive 24. FIG. 2 is a block diagram of a mapping table 50 having multiple entries 52 which enable the disk drive controller 32 of the disk drive 24 to perform a mapping function for surface virtualization. FIG. 3 is a block diagram of the hard disk platters 28 of the disk drive 24 and the current mapping state as defined by the mapping table 50.

As shown in FIG. 2, each entry 52 of the mapping table 50 includes an entry number field 54, a virtual surface identifier field 56 and a real surface identifier field 58. The entry number field 54 of each entry 52 is configured to store a unique entry number. The virtual surface identifier field 56 is configured to store an identifier which identifies a particular virtual platter surface 60 of the disk drive 24. The real surface identifier field 58 is configured to store an identifier which identifies a particular real platter surface 62 of the disk drive 24. In this manner and as shown in FIG. 3, each entry 52 identifies a relationship 64 between a virtual platter surface 60 as perceived by the host 22 and a real platter surface 62 of the disk drive 24.

Each platter 28 includes a top real platter surface 62(T) and a bottom real platter surface 62(B). Each real platter surface 62 is accessible via a read head and a write head which are illustrated by the reference numeral 66 in FIG. 3 (also see the platter interface 34 in FIG. 1).

In accordance with the example details in the mapping table 50, the first entry 52 of the mapping table 50 (i.e., entry "1") maps virtual platter surface "VS1" to real platter surface "RS1". Similarly, the second entry 52 (i.e., entry "2") maps virtual platter surface "VS2" to real platter surface "RS2", and so on. By way of example, the disk drive 24 includes three platters 28 which rotate about a spindle 68. Accordingly, the three platters 28 of the disk drive 24 provide a total of six real platter surfaces. Of course, the disk drives 24 are capable of having a number of real platters 28 which is different from three (e.g., two, four, five, etc.).

In some arrangements, the entry number field 54 of the mapping table 50 is optional and the entries 52 (or their locations within the table 50) simply correspond to virtual surface identifiers (e.g., the first entry 52 corresponds to "VS1", the second entry 52 corresponds to "VS2", and so on). Further details will now be provided with reference to FIG. 4 in combination with FIGS. 1 through 3.

Figure 4:
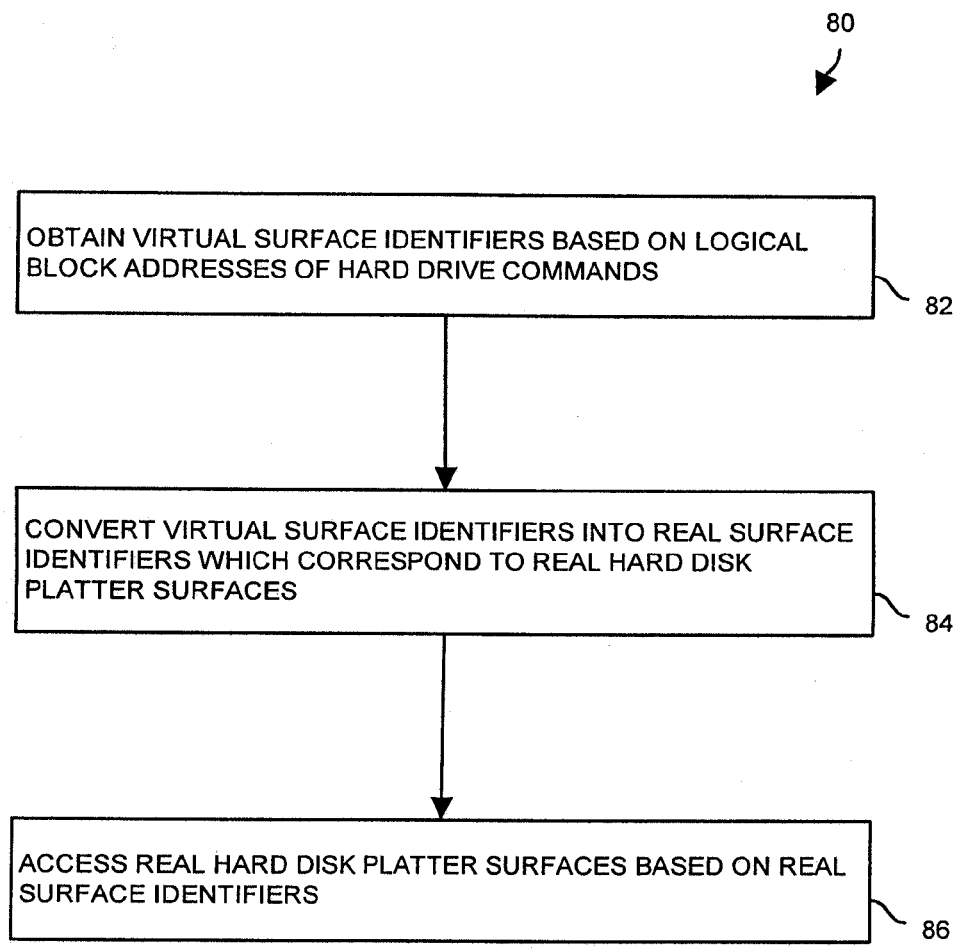
FIG. 4 is a layer diagram illustrating operation of a disk drive controller at various levels when carrying out surface virtualization.

FIG. 4 is a layer diagram 80 illustrating the layered operation of the disk drive controller 32 at various levels when carrying out surface virtualization. In the layer 82, the disk drive controller 32 obtains virtual surface identifiers based on LBAs of hard drive commands 36 which are received from the host 22 through the host interface 30 (also see FIG. 1). Here, the disk drive controller 32 identifies the virtual platter surfaces 60 (FIG. 3) containing data blocks to be accessed by the commands 36. For example, when the host 22 wishes to access data on virtual surface "VS1", the host 22 sends the disk drive 24 a command 36 having an LBA which layer 82 of the disk drive controller 32 translates into "VS1". As a result, the layer 82 of the disk drive controller 32 provides the virtual surface identifier "VS1" which is then processed by the disk drive controller 32 at the next layer 84.

In the layer 84, the disk drive controller 32 converts virtual surface identifiers corresponding to virtual platter surfaces 60 into real surface identifiers which correspond to real platter surfaces 62 (FIG. 3). Here, the layer 84 of the disk drive controller 32 obtains the virtual surface identifiers from the layer 82 and applies a mapping function to generate real surface identifiers from virtual surface identifiers. In the example above, the disk drive controller 32 searches virtual surface identifier field 56 of the entries 52 of the mapping table 50 for "VS1" (FIG. 2). Such a function is capable of being carried out by applying a standard search algorithm or other hashing technique. In the example, layer 84 of the disk drive controller 32 finds that the first entry (i.e., entry "1") includes the virtual surface identifier "VS1" outputs "RS1" as the real surface identifier which maps to the virtual surface identifier "VS1".

Alternatively, if the entries 52 of the mapping table 50 correspond directly to the virtual surface identifiers, the disk drive controller 32 simply indexes the mapping table 50. That is, to find the real surface identifier corresponding to the first virtual surface identifier "VS1", the disk controller 32 accesses the first entry 52 in the table 50. Similarly, to find the real surface identifier corresponding to the second virtual surface identifier "VS2", the disk controller 32 accesses the second entry 52 in the table 50, and so on.

In the layer 86, the disk drive controller 32 accesses real platter surfaces 62 of the hard disk platters 28 based on the real surface identifiers from the layer 84. In the example above, the disk drive controller 32 accesses the real platter surface 62 corresponding to the real surface identifier "RS1" (FIG. 3).

At this point, it should be understood that surface virtualization enables one or more real hard disk platter surfaces 62 to be keep as one or more hot spare platter surfaces 62(S). That is, such hot spare real platter surfaces 62(S) are not used to store data in the normal course of operation. Rather, such hot spare real platter surfaces 62(S) are used to replace real platter surfaces 62 that fail during the normal course of operation. Further details along these lines will now be provided with reference back to FIGS. 2 and 3.

In FIG. 2, there is no entry 52 in the mapping table 50 which maps a virtual surface identifier to the real surface identifier "RS6" because the real surface identifier "RS6" corresponds to a hot spare real platter surface 62(S). In FIG. 3, the bottom-most real platter surface 60 is labeled as a hot spare real platter surface 62(S) and thus is not used to store data in the normal course of operation. Rather, the real platter surface 62(S) is kept by the disk drive 24 for hot replacement. Accordingly, no mapping of a virtual platter surface 60 to the real platter surface 62(S) currently exists.

Nevertheless, it should be understood that not every disk drive 24 within the data storage system 20 is required to have a spare platter surface 62(S) as shown in FIG. 3. Rather, some or even most of the disk drives 24 may utilize all of their platter surfaces 62 for regular data storage (e.g., for full utilization, a virtual surface identifier would map to the real surface identifier "RS6" in FIG. 3). As long as there is a spare platter surface 62(S) on at least one disk drive 24, the data storage system 20 is capable of replacing a failed platter surface 62 with that spare platter surface 62(S) of that disk drive 24. Further details of how a disk drive 24 responds to a platter surface failure will now be provided with reference to FIGS. 5 through 7.

Figure 5:
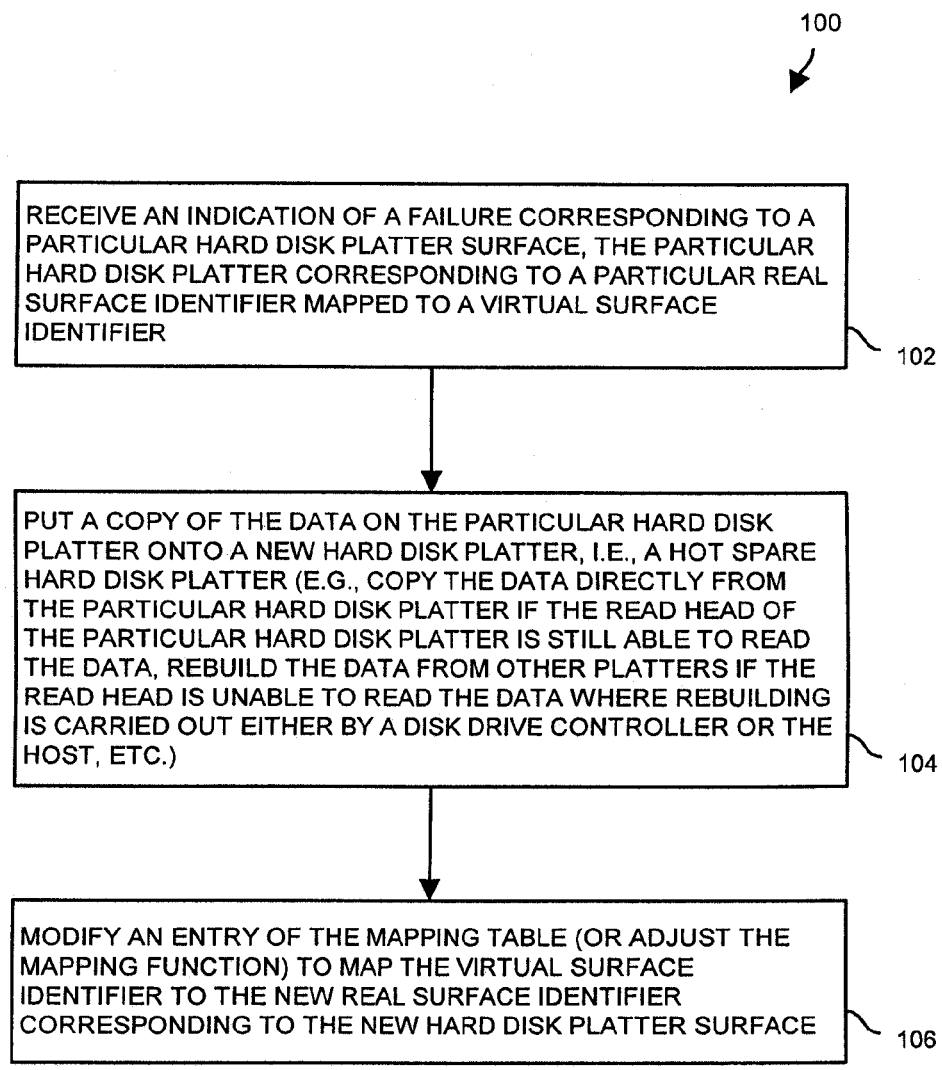
FIG. 5 is a general flow diagram illustrating a fault handling procedure of the data storage system of when responding to a failure of a hard disk platter surface (or a head to that hard disk platter surface).
Figure 6:
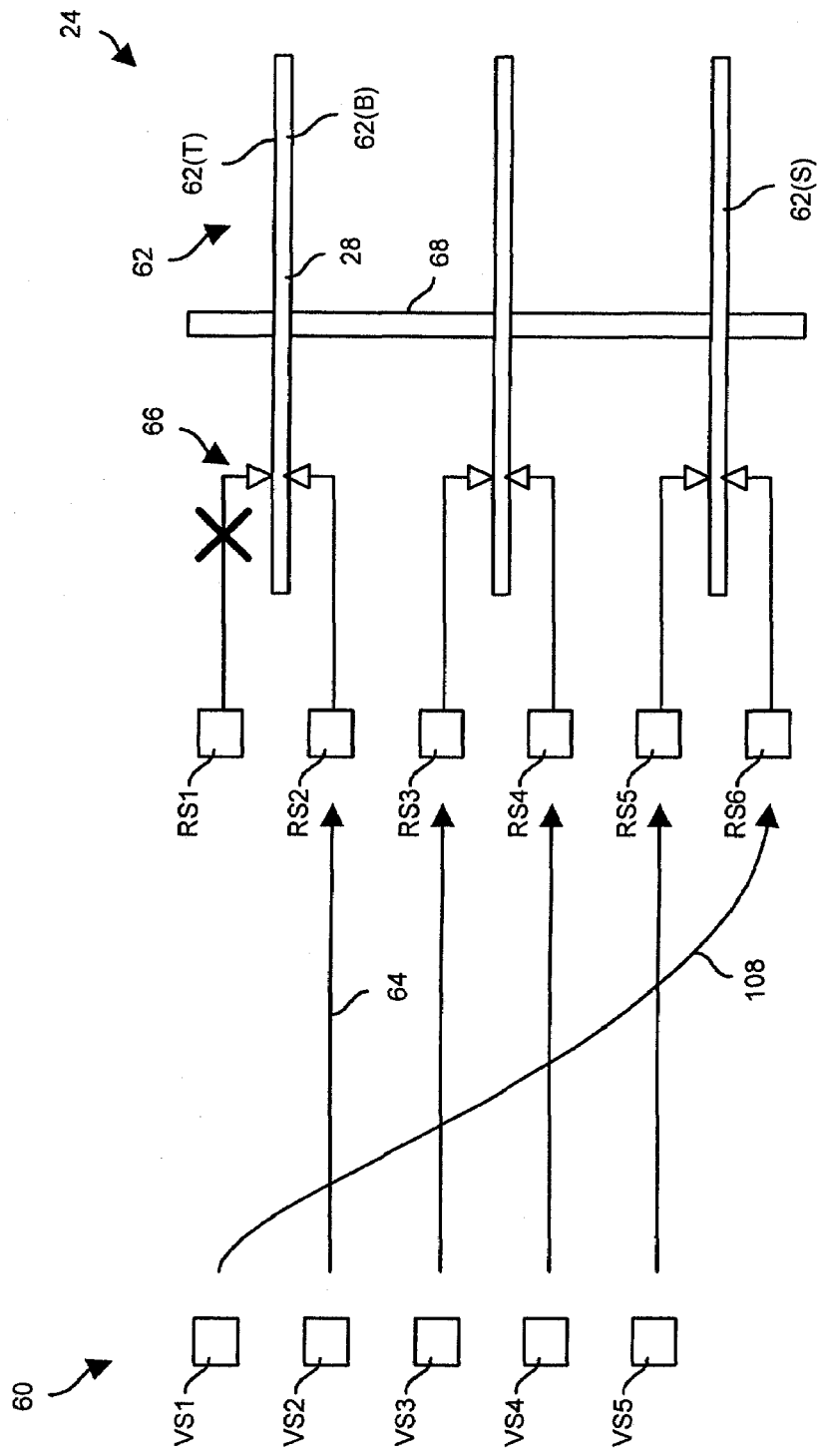
FIG. 6 is a block diagram of the set of hard disk platters of FIG. 3 after the fault handling procedure.
Figure 7:
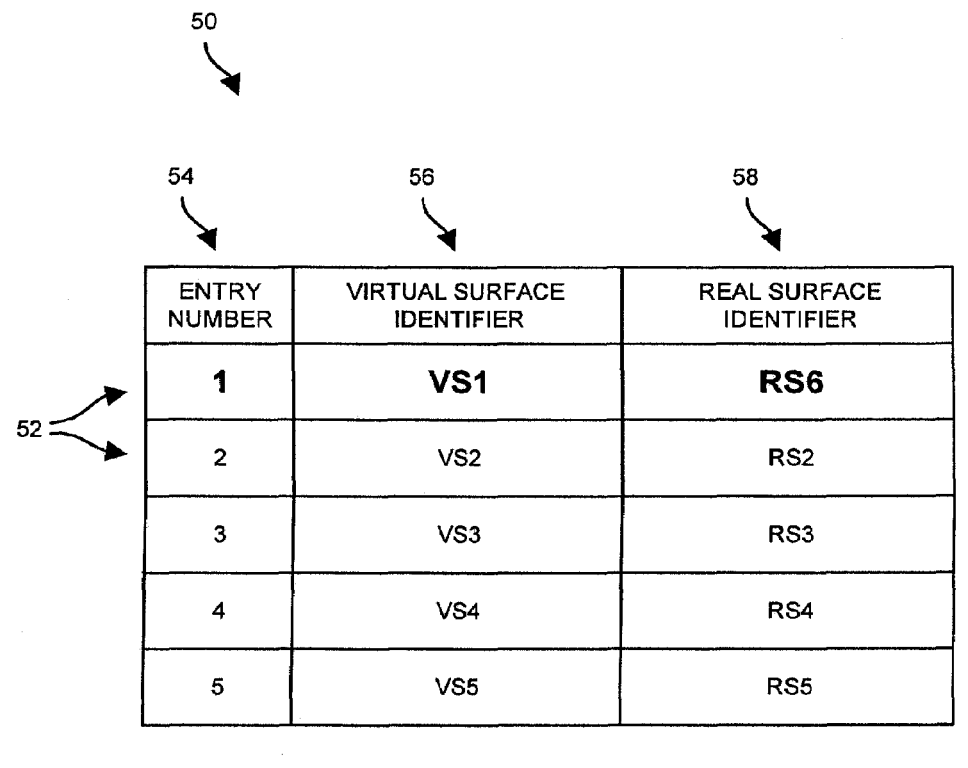

FIGS. 5 through 7 illustrate how surface virtualization enables a disk drive 24 to replace a failing platter surface 62 with a hot spare platter surface 62(S). FIG. 5 is a general flow diagram illustrating a fault handling procedure 100 when responding to a failure of a hard disk platter surface 62 (or a head to that hard disk platter surface 62) used during normal operation of the data storage system 20. FIG. 6 is a block diagram of the hard disk platters 28 of the disk drive 24 showing a new state which is different than the previous state of FIG. 3. FIG. 7 is a block diagram of the mapping table 50 which is modified to reflect the new state of FIG. 6.

Suppose that the disk drive 24 has an initial state as that shown in FIG. 3 where the real platter surfaces 62 identified by the real surface identifiers RS1, . . . , RS5 are used to store data during the normal course of operation, and that the real platter surface 62 identified by the real surface identifier RS6 (i.e., the real platter surface 62(S)) is kept as a hot spare. Now further suppose that one of the heads to the real platter surface 62 corresponding to the real surface identifier "RS1" fails resulting in fault detection by the disk drive controller 32.

In step 102 (FIG. 5), the disk drive controller 32 receives an indication of a failure corresponding to the real platter surface corresponding to the real surface identifier "RS1". For example, the disk drive controller 32 may be unable to obtain a signal from a read head or a write head to that real surface 62. The failure is illustrated in FIG. 6 with the "X" associated with the real surface identifier RS1.

In step 104 (FIG. 5), the disk drive controller 32 responds to the indication by placing a copy of the data, which is currently on the real platter surface 62 corresponding to the real surface identifier "RS1", onto the hot spare surface 62(S). In particular, if the write head has failed but the read head continues to work, the disk drive controller 32 is capable of simply reading all of the data directly from the working read head and then storing the data on the hot spare surface 62(S). This operation may occur entirely within the same disk drive 24 if both the failed real surface 62 and the spare surface 62(S) reside within the same disk drive 24. However, if the failed real surface 62 resides in one disk drive 24 and the spare surface 62(S) resides in another disk drive 24, this operation occurs across the disk drives 24.

Furthermore, if the read head has failed, the disk drive controller 32 is capable of rebuilding the data by reading one or more other real platter surfaces 62 and then storing the data on the hot spare surface 62(S). For example, for a RAID scheme that distributes data over multiple disk drives 24 (e.g., RAID5), the data on the failed real surface 62 can be rebuilt from data read from the non-failed real surfaces 62 of the disk drives 24. Additionally, if the real platters 62 within a single disk drive 24 are configured to store data using such a distributed RAID scheme, the data can even be rebuilt entirely within the single disk drive 24 and then stored on a spare surface 62(S) of that single disk drive 24 if such a spare surface 62(S) is available within that single disk drive 24.

In step 106 (FIG. 5), the disk drive controller 32 modifies the entry 52 (i.e., entry "1") of the mapping table 50 to map the virtual surface identifier "VS1" to the real surface identifier "RS6" which corresponds to the hot spare surface 62(S) (FIG. 7). In particular, the disk drive controller 32 changes the contents of the real surface identifier field 58 of that entry 52 to now store the new surface identifier "RS6". This new relationship is illustrated in FIG. 6 as the reference line 108 which now points from the virtual platter surface 60 corresponding to virtual surface identifier "VS1" to the real surface identifier "RS6".

It should be understood that the host 22 does not need to change any LBAs in the commands 36 to the disk drive 24 and that replacement of the failed platter surface 62 with the hot spare platter surface 62(S) can take place transparently to the host 22. That is, the host 22 continues to use the same LBAs for any future access to the data since the host 22 still addresses the same virtual platter surfaces 60. However, the disk drive controller 32 now maps the failed virtual platter surface 60 to the hot spare platter surface 62(S) which has replaced the failed real platter surface 62. Moreover, since the other real platter surfaces 62 of the disk drive 24 are still usable, there is no need to replace the entire disk drive 24 with an entire new hot spare disk drive 24. Further details will now be provided with reference to FIG. 8.

FIG. 8 shows a block diagram of a mapping table 150 illustrating operation of the fault handling procedure 100 of FIG. 5 when surface virtualization is implemented across multiple disk drives 24, i.e., disk drives 24(1), . . . , 24(n). That is, the fault handling procedure 100 of FIG. 5 does not need to be performed entirely within a disk drive controller 32 of a disk drive 24 as described above in connection with FIGS. 2 through 7. Rather, the host 22 can obtain and maintain virtual and real platter surface details from the disk drives 24 through an application programming interface (API) which is supported by the disk drives 24. By employing such an API, the host 22 is then capable of monitoring surface mapping and even building an aggregate mapping table for carrying out an aggregate mapping function as shown in FIG. 8.

In FIG. 8, the details of two disk drives 24 are illustrated. In particular, entries "1" through "5" providing mapping of virtual surface identifiers "VS1_1", . . . , "VS1_5" to real surface identifiers "RS1_1", . . . , "RS1_5", respectively, for a first disk drive 24 (e.g., the disk drive 24(1) in FIG. 1). Similarly, entries "6" through "11" providing mapping of virtual surface identifiers "VS2_1", . . . , "VS2_6" to real surface identifiers "RS2_1", "RS2_6", respectively, for a second disk drive 24 (e.g., the disk drive 24(n) in FIG. 1). Initially, the real surface identifier "RS1_6" is purposefully not mapped to any virtual platter surface 60 because the real platter surface 62 corresponding to the real surface identifier "RS1_6" is initially reserved as a hot spare surface 62(S).

Now, suppose that the real platter surface 62 corresponding to the real surface identifier "RS2_1" which maps to the virtual surface identifier "VS2_1" encounters a failure. The host 22 is configured to coordinate replacement of that real platter surface 62 with the hot spare surface 62(S) by communicating with both the first and second disk drives 24 through the API to each disk drive 24. Accordingly, the host 22 effectuates placement of the data which was originally on the failing real platter surface 62 within the second disk drive 24 onto the hot spare surface 62(S) of the first disk drive 24 (e.g., by reading through a working read head to the failing real platter surface 62, by rebuilding the data from RAID, etc.). As a result, the host 22 is now capable of accessing that data from the hot spare surface 62(S) which now works in place of the failed real platter surface 62 corresponding to the real surface identifier "RS2_1".

Thus, a hot spare real platter surface 62(S) is capable of operating as a hot spare to real platter surfaces 62 of other disk drives 24 of the data storage system 20. Such operation alleviates the need for each disk drive 24 to provide a hot spare. Furthermore, the host 22 is not required to re-address the LBA address space.

As described above, an improved technique involves providing access to hard disk platter surfaces using surface virtualization. Here, a mapping function is capable of mapping virtual platter surfaces 60 to real platter surfaces 62 (or alternatively virtual disk drive heads to real disk drive heads). Accordingly, from the perspective of a host 22, disk accesses can be carried out by addressing LBAs which translate to virtual platter surfaces. If there is a failure of a particular real platter surface 62, the mapping function can simply re-map the virtual platter surface 62 to a new real platter surface 62(S) without changing any addressing at the host 22 (e.g., mapping of LBAs to virtual platter surfaces 60 by the host 22 can remain intact). Such a technique enables efficient surface-level sparing inside a disk drive 24.

For example, it should be understood that the above-describe surface sparing techniques are capable of being carried out either within a disk drive controller 32 of a disk drive 24 or by a host 22. In particular, in some arrangements, the circuitry of the disk drive controller 32 is configured so that replacement of a failed real surface 62 within a disk drive 24 is carried out by the disk drive controller 32 of that disk drive 24; even if the data must be rebuilt, the rebuilding operation can be carried out by the disk drive controller 32. In other arrangements, the host 22 is configured to maintain the mapping table 50 (see FIG. 8) and then carry out the rebuilding operation using the API to the disk drives 24.

Additionally, it should be understood that the above-described surface sparing techniques can be combined with other mechanisms as well. For example, the same disk drives 24 which are configured to support surface sparing can be configured to carry out block sparing. Preferably, when surface sparing and block sparing are used together in the same disk drive 24, the disk drive controller 32 maps a failed block on a particular real surface 62 to a spare block on that same real surface 62.

While various embodiments have been particularly shown and described, it will be understood by those skilled in the art that various changes in form and details may be made therein without departing from the spirit and scope of these embodiments as defined by the appended claims.

What is claimed is:

1. A data storage system, comprising:
   a host; and
   a set of disk drives coupled to the host, the set of disk drives being configured to provide access to multiple hard disk platter surfaces using surface virtualization, each disk drive of the set of disk drives being configured to:
   receive a command to access a hard disk platter surface from the host, the command specifying an address,
   provide a virtual surface identifier based on the address specified by the command,
   generate a particular real surface identifier based on the virtual surface identifier, the particular real surface identifier corresponding to a particular hard disk platter surface among the multiple hard disk platter surfaces, and
   access the particular hard disk platter surface among the multiple hard disk platter surfaces based on the particular real surface identifier.

2. A data storage system as in claim 1 wherein each disk drive, when providing the virtual surface identifier, is configured to:
   output the virtual surface identifier based on a logical block address of the command; and
wherein each disk drive, when generating the particular real surface identifier based on the virtual surface identifier, is configured to:
   convert the virtual surface identifier to the particular real surface identifier based on an entry of a mapping table having multiple entries, the multiple entries mapping virtual surface identifiers to real surface identifiers.

3. A data storage system as in claim 2 wherein the entry of the mapping table initially maps the virtual surface identifier to the particular real surface identifier; and wherein each disk drive is further configured to:
   receive an indication of a failure corresponding to the particular hard disk platter surface, and
   in response to the indication, modify the entry of the mapping table to map the virtual surface identifier to a new real surface identifier, the new real surface identifier corresponding to a new hard disk platter surface among the multiple hard disk platter surfaces, the new hard disk platter surface being different than the particular hard disk platter surface.

4. A data storage system as in claim 1 wherein a particular disk drive is configured to:
   provide a signal indicating that a read head configured to read from a first hard disk platter surface is in working order and a write head configured to write to the first hard disk platter surface has failed, and
   copy data from the first hard disk platter surface to a second hard disk platter surface through the read head configured to read from the first hard disk platter surface.

5. A data storage system as in claim 4 wherein the first hard disk platter surface and the second hard disk platter surface reside within the particular disk drive of the set of disk drives; and wherein obtaining the signal and copying the data are carried out by a disk drive controller of the particular disk drive.

6. A data storage system as in claim 4 wherein the first hard disk platter surface and the second hard disk platter surface reside within different disk drives of the set of disk drives; and wherein copying the data is initiated by the host.

7. A data storage system as in claim 1 wherein host is configured to:
   obtain a signal indicating that a read head configured to read from a first hard disk platter surface has failed; and
   rebuild data from the first hard disk platter surface from other data obtained from a set of hard disk platter surfaces that does not include the first hard disk platter surface, and store the rebuilt data on a second hard disk platter surface.

8. A data storage system as in claim 7 wherein the first hard disk platter surface and the second hard disk platter surface reside within different disk drives of the set of disk drives.

9. A disk drive apparatus, comprising:
   an interface;
   multiple hard disk platter surfaces defined by a set of hard disk platters; and a disk drive controller coupled to the interface and to the multiple hard disk platter surfaces, the disk drive controller being configured to:
receive a command to access a hard disk platter surface through the interface, the command specifying an address,
provide a virtual surface identifier based on the address specified by the command,
generate a particular real surface identifier based on the virtual surface identifier, the particular real surface identifier corresponding to a particular hard disk platter surface among the multiple hard disk platter surfaces, and
access the particular hard disk platter surface among the multiple hard disk platter surfaces based on the particular real surface identifier.

10. A disk drive apparatus as in claim 9 wherein the disk drive controller, when providing the virtual surface identifier, is configured to:
output the virtual surface identifier based on a logical block address of the command; and
wherein the disk drive controller, when generating the particular real surface identifier based on the virtual surface identifier, is configured to:
convert the virtual surface identifier to the particular real surface identifier based on an entry of a mapping table having multiple entries, the multiple entries mapping virtual surface identifiers to real surface identifiers.

11. A disk drive apparatus as in claim 10 wherein the entry of the mapping table initially maps the virtual surface identifier to the particular real surface identifier; and wherein the disk drive controller is further configured to:
receive an indication of a failure corresponding to the particular hard disk platter surface, and
in response to the indication, modify the entry of the mapping table to map the virtual surface identifier to a new real surface identifier, the new real surface identifier corresponding to a new hard disk platter surface among the multiple hard disk platter surfaces, the new hard disk platter surface being different than the particular hard disk platter surface.

12. A disk drive apparatus as in claim 9 wherein the disk drive controller is configured to:
obtain a signal indicating that a read head configured to read from a first hard disk platter surface is in working order and a write head configured to write to the first hard disk platter surface has failed, and
copy data from the first hard disk platter surface to a second hard disk platter surface through the read head configured to read from the first hard disk platter surface.

13. A method of accessing a hard disk platter surface using surface virtualization, the method comprising:
receiving a command to access a hard disk platter surface, the command specifying an address;
providing a virtual surface identifier based on the address specified by the command;
generating a particular real surface identifier based on the virtual surface identifier, the particular real surface identifier corresponding to a particular hard disk platter surface among multiple hard disk platter surfaces of a set of disk drives; and
accessing the particular hard disk platter surface among the multiple hard disk platter surfaces of the set of disk drives based on the particular real surface identifier.

14. A method as in claim 13 wherein providing the virtual surface identifier includes:
outputting the virtual surface identifier based on a logical block address of the command; and
wherein generating the particular real surface identifier based on the virtual surface identifier includes:
converting the virtual surface identifier to the particular real surface identifier based on an entry of a mapping table having multiple entries, the multiple entries mapping virtual surface identifiers to real surface identifiers.

15. A method as in claim 14 wherein the entry of the mapping table initially maps the virtual surface identifier to the particular real surface identifier; and wherein the method further comprises:
receiving an indication of a failure corresponding to the particular hard disk platter surface, and
in response to the indication, modifying the entry of the mapping table to map the virtual surface identifier to a new real surface identifier, the new real surface identifier corresponding to a new hard disk platter surface among the multiple hard disk platter surfaces of the set of disk drives, the new hard disk platter surface being different than the particular hard disk platter surface.

16. A method as in claim 15 wherein receiving the indication of the failure corresponding to the particular hard disk platter surface includes:
obtaining a signal indicating that a read head configured to read from the particular hard disk platter surface is in working order and a write head configured to write to the particular hard disk platter surface has failed; and
wherein the method further comprises:
copying data from the particular hard disk platter surface to the new hard disk platter surface through the read head configured to read from the particular hard disk platter surface.

17. A method as in claim 16 wherein the particular hard disk platter surface and the new hard disk platter surface reside within a single disk drive of the set of disk drives; and wherein obtaining the signal and copying the data are carried out by a disk drive controller of the single disk drive.

18. A method as in claim 16 wherein the particular hard disk platter surface and the new hard disk platter surface reside within different disk drives of the set of disk drives; and wherein obtaining the signal and copying the data are carried out by a host connected to the set of disk drives.

19. A method as in claim 15 wherein receiving the indication of the failure corresponding to the particular hard disk platter surface includes:
obtaining a signal indicating that a read head configured to read from the particular hard disk platter surface has failed; and
wherein the method further comprises:
rebuilding data from the particular hard disk platter surface from other data obtained from a set of hard disk platter surfaces that does not include the particular hard disk platter surface, and storing the rebuilt data on the new hard disk platter surface.

20. A method as in claim 19 wherein the particular hard disk platter surface and the new hard disk platter surface reside within different disk drives of the set of disk drives; and wherein obtaining the signal and rebuilding the data are carried out by a host connected to the set of disk drives.

* * * * *